United States Patent
Veloso et al.

(10) Patent No.: US 11,076,049 B2
(45) Date of Patent: Jul. 27, 2021

(54) SYSTEMS AND METHODS FOR ROUTING COMMUNICATIONS TO AGENTS BASED ON ATTRIBUTES

(71) Applicant: Talkdesk, Inc, San Francisco, CA (US)

(72) Inventors: António Veloso, Lisbon (PT); Alexandre Pinheiro, Lisbon (PT)

(73) Assignee: Talkdesk, Inc., San Francisco, CA (US)

( * ) Notice: Subject to any disclaimer, the term of this patent is extended or adjusted under 35 U.S.C. 154(b) by 0 days.

(21) Appl. No.: 16/658,773

(22) Filed: Oct. 21, 2019

(65) Prior Publication Data

US 2021/0117899 A1    Apr. 22, 2021

Related U.S. Application Data

(63) Continuation of application No. 16/655,727, filed on Oct. 17, 2019, now abandoned.

(51) Int. Cl.
*H04M 3/523* (2006.01)
*G06Q 10/06* (2012.01)
*G06F 16/909* (2019.01)
*G06Q 10/10* (2012.01)
*G06N 5/02* (2006.01)
*G06Q 30/00* (2012.01)

(52) U.S. Cl.
CPC ........ *H04M 3/5233* (2013.01); *G06F 16/909* (2019.01); *G06N 5/027* (2013.01); *G06Q 10/0633* (2013.01); *G06Q 10/06312* (2013.01); *G06Q 10/06393* (2013.01); *G06Q 10/06395* (2013.01); *G06Q 10/06398* (2013.01); *G06Q 10/063112* (2013.01); *G06Q 10/1097* (2013.01); *G06Q 30/016* (2013.01)

(58) Field of Classification Search
None
See application file for complete search history.

(56) References Cited

U.S. PATENT DOCUMENTS

| | | | | |
|---|---|---|---|---|
| 7,103,171 | B1* | 9/2006 | Annadata | H04M 3/523 379/265.12 |
| 2003/0169870 | A1* | 9/2003 | Stanford | H04M 3/5233 379/265.12 |
| 2014/0079193 | A1* | 3/2014 | Steiner | H04M 3/5166 379/88.01 |

* cited by examiner

*Primary Examiner* — Antim G Shah (74) *Attorney, Agent, or Firm* — Rimon PC; Marc Kaufman (57) ABSTRACT

In one embodiment, agents are each assigned a plurality of attributes based on their skills. Each attribute may be associated with a skill such as accounting, technical support, language, etc. In addition, some attributes may have an associated score or proficiency level that describes how proficient the agent is with respect to the attribute. Administrators may then create rules to route communications to agents based on the associated attributes and a customer category that is assigned to the communications.

30 Claims, 7 Drawing Sheets

@ Calls Contacts Voicemail* Teams Reporting Admin ::: Apps˅ Browser mode˅ 🅑 Available˅

Numbers Flows Agents Attributes Dispositions Roles Integrations Preferences Billing Invoices Attributes
Attributes list  Categories

| | 310 | 315 | 320 | 325 |
|---|---|---|---|---|
| | | | Q ≡ ● | Create New Attribute 330 |
| ☐ | Billing Department | • ACTIVE | ஃ 18 Agents | ✎ |
| ☐ | English Languages | • ACTIVE | ஃ 26 Agents | ✎ |
| ☐ | German Languages | • ACTIVE | ஃ 10 Agents | ✎ |
| ☐ | Sales Department | • ACTIVE | ஃ 12 Agents | ✎ |
| ☐ | Salesforce Work tools | • ACTIVE | ஃ 26 Agents | ✎ |
| ☐ | Tech problems Department | • ACTIVE | ஃ 5 Agents | ✎ |

SYSTEMS AND METHODS FOR ROUTING COMMUNICATIONS TO AGENTS BASED ON ATTRIBUTES

CROSS-REFERENCE TO RELATED APPLICATIONS

This application is a continuation of U.S. patent application Ser. No. 16/655,727 filed on Oct. 17, 2019, entitled "SYSTEMS AND METHODS FOR ROUTING COMMUNICATIONS TO AGENTS BASED ON ATTRIBUTES." The contents of which are hereby incorporated by reference.

BACKGROUND

Queues are a popular way of assigning agents to customers in a contact center. For example, a set of queues may be created, with each queue associated with a particular expertise or agent qualification. For example, agents who are trained on tech support may be assigned, or logged in, to a queue associated with tech support questions, and agents who are trained on billing may be assigned, or logged in, to a queue associated with billing questions.

When a call (or other type of communication like SMS, Chat, or Social Network post) is received at the contact center, a topic associated with the call is determined, and the call is routed to an agent from the queue that is best suited to the determined topic. Continuing the example above, when a call is received for technical support, an agent in the queue associated with tech support questions is selected to receive the call, and when a call is received for accounting, an agent in the queue associated with billing questions is selected to receive the call.

While queues are a popular way to route calls in contact centers, there are drawbacks associated with queues. First, the use of queues may result in an inefficient use of agent resources. For example, a contact center may be experiencing a large volume of calls related to technical support which may result in a large wait time for customers as all of the agents in the technical support queue are occupied. However, there may be free agents in the accounting queue that could handle the calls, but they may not be automatically utilized because they are not in the technical support queue.

Second, the only way for available agents to move from one queue to another is by manual action of the administrator of the contact center, the supervisor or the agent himself. This would be done following the previous example by manually reassigning, or logging off and logging in, agents from the accounting queue onto the technical support queue.

Third, doing that type of action manually with no supporting intelligence, may end up resulting in two queues with increasing waiting time, having a worse result than initially when it was focused on solely one queue.

Fourth, queues are typically assigned to calls on a first come first service basis, which may not result in the best agents being assigned to important calls. For example, an important customer may call with a billing question, and may be assigned an available agent from the accounting queue. However, there is no way to choose the best agent available from the accounting queue to serve the VIP customer.

Fifth, agents are typically assigned to queues based on a single skill (i.e., accounting or billing). However, often multiple skills may be desired in an agent to handle a particular call. For example, a Chinese customer may call with a billing question. It therefore may be desirable to assign an agent to the call who has the skills of both billing and the Mandarin language. However, there may be no queue of agents who are both skilled in Mandarin and billing.

SUMMARY

In one embodiment, agents are each assigned a plurality of attributes based on their skills. Each attribute may be associated with a skill such as accounting, technical support, language, VIP specialist, etc. In addition, some attributes may have an associated score or proficiency level that describes how proficient the agent is with respect to that specific attribute. Administrators may then create rules to route communications to agents based on the associated attributes and a customer category that is assigned to the communications.

When a communication is received, a customer category associated with the communication is determined. The customer categories may be created by the administrators and may be based on characteristics of the communication or customer such as its country of origin, language spoken by the customer, VIP or importance of the customer, and the topic associated with the communication (e.g., tech support or billing).

One or more rules associated with the determined customer category are retrieved. The attributes associated with each available agent are dynamically calculated and compared against the rules associated with the customer category. The communication may then be routed to an agent who satisfies some or all of the rules associated with the category. If no agents are determined who satisfy any of the rules associated with the category, some or all of the attributes from the rules may be relaxed until a suitable agent is determined. Relaxing the rule may include adding an attribute and an OR operator to the rule or removing or replacing an AND operator with an OR operator. Relaxing the rule may further include reducing the score or proficiency level associated with an attribute of the rule.

The embodiments described herein solve many of the problems associated with the prior art described above. First, by using attributes to select agents rather than queues, the inefficient usage of agent resources associated with queue is reduced. Second, because attributes allow for relatively complex rules to be used to assign agents based on various combinations of desired skills and proficiencies, administrators can determine the agent best suited to handle a particular communication. This may lead to reduced communication times, and greater communication experiences for customers.

In an embodiment, a method is provided. The method includes: receiving a communication by a computing device from a customer; determining a rule associated with the customer by the computing device; for each agent of a plurality of agents, determining a plurality of attributes associated with the agent by the computing device; based on the determined rule and the plurality of attributes determined for each agent, selecting an agent of the plurality of agents by the computing device; and routing the received communication to the selected agent by the computing device.

Embodiments may include some or all of the following features. Each attribute may include a proficiency level. The rule may include a plurality of attributes. The method may further include calculating at least one performance metric for each agent of the plurality of agents, and based on the determined rule, the plurality of attributes determined for each agent, and the calculated at least one performance metric, selecting an agent of the plurality of agents. The at least one performance record may include one of an average handling time or a customer satisfaction score. Calculating at least one performance metric for each agent of the plurality of agents may include, for each agent of the plurality of agents: determining communication history data associated with the agent; and calculating the at least one performance metric from the communication history data. Determining the plurality of attributes associated with the agent by the computing device may include dynamically calculating at least one attribute of the plurality of attributes associated with the agent. The plurality of attributes may include language attributes, skill attributes, age attributes, geographical attributes, and premium service attributes. The method may further include determining a customer category for the customer, and wherein determining the rule associated with the customer comprises determining the rule associated with the customer category. The customer category may be determined based one or more of a language spoken by the customer, a country associated with the customer, a priority associated with the customer, a value associated with the customer, previous communications associated with the customer, and a mood of the customer.

In an embodiment, a method is provided. The method includes: displaying a plurality of attributes by a computing device; receiving a selection of at least one attribute of the plurality of attributes by the computing device; receiving a selection of a proficiency level for the selected at least one attribute by the computing device; and associating a rule with a customer category, wherein the rule is based on the selected at least one attribute of the plurality of attributes and the selected proficiency level.

Embodiments may include some or all of the following features. The selected proficiency level may include a minimum proficiency level of the at least one attribute. The plurality of attributes may include language attributes, skill attributes, age attributes, geographical attributes, and premium service attributes. The method may further include receiving a selection of a performance metric, and wherein the rule is based on the selected at least one attribute of the plurality of attributes, the selected proficiency level, and the performance metric. The performance metric may include one of an average handling time, a customer satisfaction score, fastest solver, best seller, highest proficiency level, and lowest proficiency level. The method may further include: receiving a communication from a customer; determining the customer category associated with the customer; selecting the rule associated with the customer category; for each agent of a plurality of agents, determining a plurality of attributes associated with the agent; based on the determined rule and the plurality of attributes determined for each agent, selecting an agent of the plurality of agents; and routing the received communication to the selected agent.

In an embodiment, a method is provided. The method includes: receiving a communication by a computing device from a customer; determining a rule associated with the customer by the computing device; for each agent of a plurality of agents, determining a plurality of attributes associated with the agent by the computing device; based on the determined rule and the plurality of attributes determined for each agent, determining that no agent of the plurality of agents satisfies the determined rule by the computing device; and in response to the determination, relaxing the rule associated with the customer by the computing device.

Embodiments may include some or all of the following features. Each attribute may include a proficiency level. The rule may include a plurality of attributes. The plurality of attributes may include language attributes, skill attributes, age attributes, geographical attributes, and premium service attributes. The method may further include determining a customer category for the customer, and wherein determining the rule associated with the customer may include determining the rule associated with the customer category. Relaxing the rule may include adding at least one attribute to the rule along with an OR operator. Relaxing the rule include replacing at least one OR operator in the rule with an AND operator.

In an embodiment, a method is provided. The method includes: receiving a communication by a computing device from a customer; determining a rule associated with the customer by the computing device, wherein the rule is associated with a plurality of attributes; for each agent of a plurality of agents, determining a plurality of attributes associated with the agent by the computing device; based on the plurality of attributes of the determined rule and the plurality of attributes determined for each agent, determining at least one attribute of the plurality of attributes associated with the determined rule that is not associated with any agent of the plurality of agents by the computing device; in response to the determination, retrieving a list of agents of the plurality of agents who previously handled communications associated with the at least one attribute; and routing the received communication to an agent from the list of agents.

Embodiments may include some or all of the following features. Each attribute may include a proficiency level. The plurality of attributes associated with the rule may include language attributes, skill attributes, age attributes, geographical attributes, and premium service attributes. The method may further include determining a customer category for the customer, and wherein determining the rule associated with the customer may include determining the rule associated with the customer category. The method may further include: determining that an agent of the plurality of agents handled a communication associated with the at least one attribute and that the agent of the plurality of agents is not associated with the at least one attribute; determining that a score of the at least one agent for the communication exceeds a threshold score; and in response to the determination, adding the agent to the list of agents who previously handled communications associated with the at least one attribute. The method may further include determining the score based on one or more of a customer survey or based on an analysis of a transcript associated with the communication. The method may further include adding the at least one attribute to the plurality of attributes associated with the agent in response to determining that the score of the at least one agent for the communication exceeded a threshold score.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described within a cloud-based contact center, it will become evident to those skilled in the art that the implementations are not limited thereto.

Figure 1:
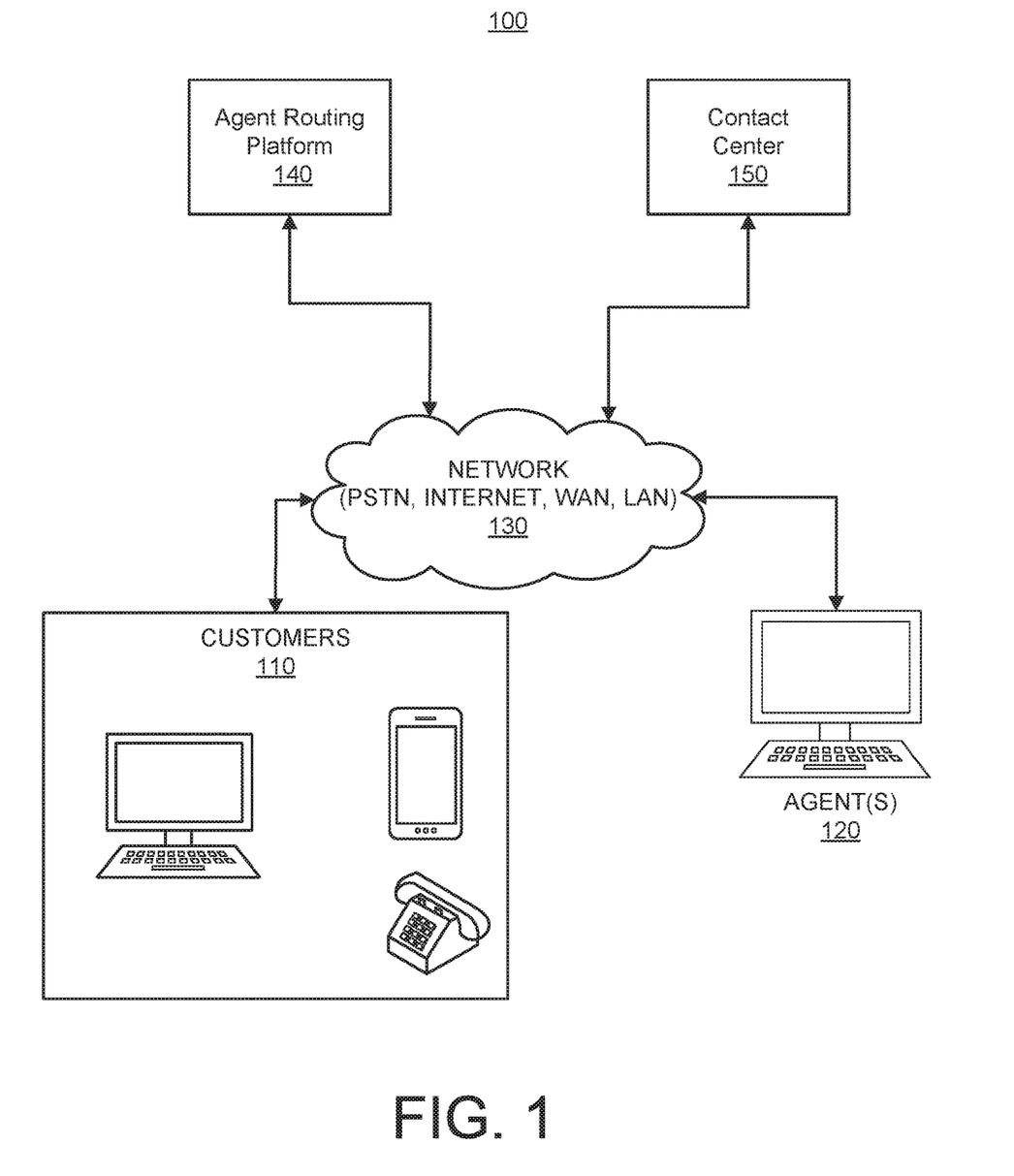
FIG. 1 is an illustration of an example system architecture.

FIG. 1 is an example system architecture 100, and illustrates example components, functional capabilities and optional modules that may be included in a cloud-based contact center infrastructure solution. Customers 110 (also referred to herein as callers) interact with a contact center 150 using voice, email, text, and web interfaces (i.e., communications) in order to communicate with agent(s) 120 through a network 130 and one or more of text or multimedia channels. The agent(s) 120 may be remote from the contact center 150 and handle communications with customers 110 on behalf of an enterprise. The agent(s) 120 may utilize devices, such as but not limited to, work stations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other. For example, telephone communication may traverse networks such as a public switched telephone networks (PSTN), Voice over Internet Protocol (VoIP) telephony (via the Internet), a Wide Area Network (WAN) or a Large Area Network. The network types are provided by way of example and are not intended to limit types of networks used for communications.

Agent(s) 120 and customers 110 may communicate with each other and with other services over the network 130. For example, a customer calling on telephone handset may connect through the PSTN and terminate on a private branch exchange (PBX). A video call originating from a tablet may connect through the network 130 terminate on the media server. A smartphone may connect via the WAN and terminate on an interactive voice response (IVR)/intelligent virtual agent (IVA) components. IVR are self-service voice tools that automate the handling of incoming and outgoing calls. Advanced IVRs use speech recognition technology to enable customers to interact with them by speaking instead of pushing buttons on their phones. IVR applications may be used to collect data, schedule callbacks and transfer calls to live agents. IVA systems are more advanced and utilize artificial intelligence (AI), machine learning (ML), advanced speech technologies (e.g., natural language understanding (NLU)/natural language processing (NLP)/natural language generation (NLG)) to simulate live and unstructured cognitive conversations for voice, text and digital interactions. In yet another example, Social media, email, SMS/MMS, IM may communicate with their counterpart's application (not shown) within the contact center 150.

The contact center 150 itself be in a single location or may be cloud-based and distributed over a plurality of locations. The contact center 150 may include servers, databases, and other components. In particular, the contact center 150 may include, but is not limited to, a routing server, a SIP server, an outbound server, a reporting/dashboard server, automated call distribution (ACD), a computer telephony integration server (CTI), an email server, an IM server, a social server, a SMS server, and one or more databases for routing, historical information and campaigns.

The ACD is used by inbound, outbound and blended contact centers to manage the flow of interactions by routing and queuing them to the most appropriate agent. Within the CTI, software connects the ACD to a servicing application (e.g., customer service, CRM, sales, collections, etc.), and looks up or records information about the customer. CTI may display a customer's account information on the agent desktop when an interaction is delivered. Campaign management may be performed by an application to design, schedule, execute and manage outbound campaigns. Campaign management systems are also used to analyze campaign effectiveness.

For inbound SIP messages, the routing server may use statistical data from reporting/dashboard information and a routing database to the route SIP request message. A response may be sent to the media server directing it to route the interaction to a target agent 120. The routing database may include: customer relationship management (CRM) data; data pertaining to one or more social networks (including, but not limited to network graphs capturing social relationships within relevant social networks, or media updates made by members of relevant social networks); agent skills data; data extracted from third party data sources including cloud-based data sources such as CRM; or any other data that may be useful in making routing decisions.

The integration of real-time and non-real-time communication services may be performed by unified communications (UC)/presence sever. Real-time communication services include Internet Protocol (IP) telephony, call control, instant messaging (IM)/chat, presence information, real-time video and data sharing. Non-real-time applications include voicemail, email, and SMS. The communications services are delivered over a variety of communications devices, including IP phones, personal computers (PCs), smartphones and tablets. Presence provides real-time status information about the availability of each person in the network, as well as their preferred method of communication (e.g., phone, email, chat and video).

Recording applications may be used to capture and play back audio, video, and screen interactions between customers and agents. Recording systems should capture everything that happens during interactions and what agents do on their desktops. Surveying tools may provide the ability to create and deploy post-interaction customer feedback surveys in voice and digital channels. Typically, the IVR/IVA development environment is leveraged for survey development and deployment rules. Reporting/dashboards are tools used to track and manage the performance of agents, teams, departments, systems and processes within the contact center. Reports are presented in narrative, graphical or tabular formats. Reports can be created on a historical or real-time basis, depending on the data collected by the contact center applications. Dashboards typically include widgets, gadgets, gauges, meters, switches, charts and graphs that allow role-based monitoring of agent, queue and contact center performance. Unified messaging (UM) applications include various messaging and communications media (voicemail, email, SMS, fax, video, etc.) stored in a common repository and accessed by users via multiple devices through a single unified interface.

In order to improve the routing of calls to agents 120, the calls (or other communications) received by the contact center 150 may be routed to agents 120 by an agent routing platform 140. Communications as used herein may include telephone calls, texts, e-mails, and any other type of electronic communications. While shown in FIG. 1 as separate from the contact center 150, depending on the embodiment the agent routing platform 140 may be part of the contact center 150.

As will be described further in FIG. 2, the agent routing platform 140 may route communications to agents 120 based on attributes associated with each agent 120, and one or more rules. As used herein an attribute may be a skill or characteristic associated with an agent 120. Examples of attributes may include language attributes (e.g., what languages that the agent speaks), work-related attributes (e.g., the agent 120 is trained to answer communications related to technical support, or billing, returns, shipping, etc.), and attributes representing any accolades or achievements that the agent 120 may have received (e.g., has the agent 120 been rewarded for providing excellent service). In some embodiments, each attribute may be associated with a proficiency score.

A rule for routing a communication may specify a plurality of required attributes and may provide a minimum proficiency score for one or more of the specified attributes. For example, a sample rule may specify that an agent 120 have an attribute of "technical support" and an attribute of "speaks Mandarin" with a proficiency level greater than or equal to four. A communication associated with such a rule may only be routed to an agent 120 that has the attribute "technical support" and speaks Mandarin with a proficiency level that is greater than or equal to four.

In some embodiments, the agent routing platform 140 may associate rules with customer categories and may route communications according to the customer category associated with a communication or customer. Examples of customer categories may include the language spoken by a customer, the country associated with a customer, the type of service requested by the customer (e.g., tech support or billing), and a priority associated with the customer (e.g., is the customer a VIP?).

Figure 2:
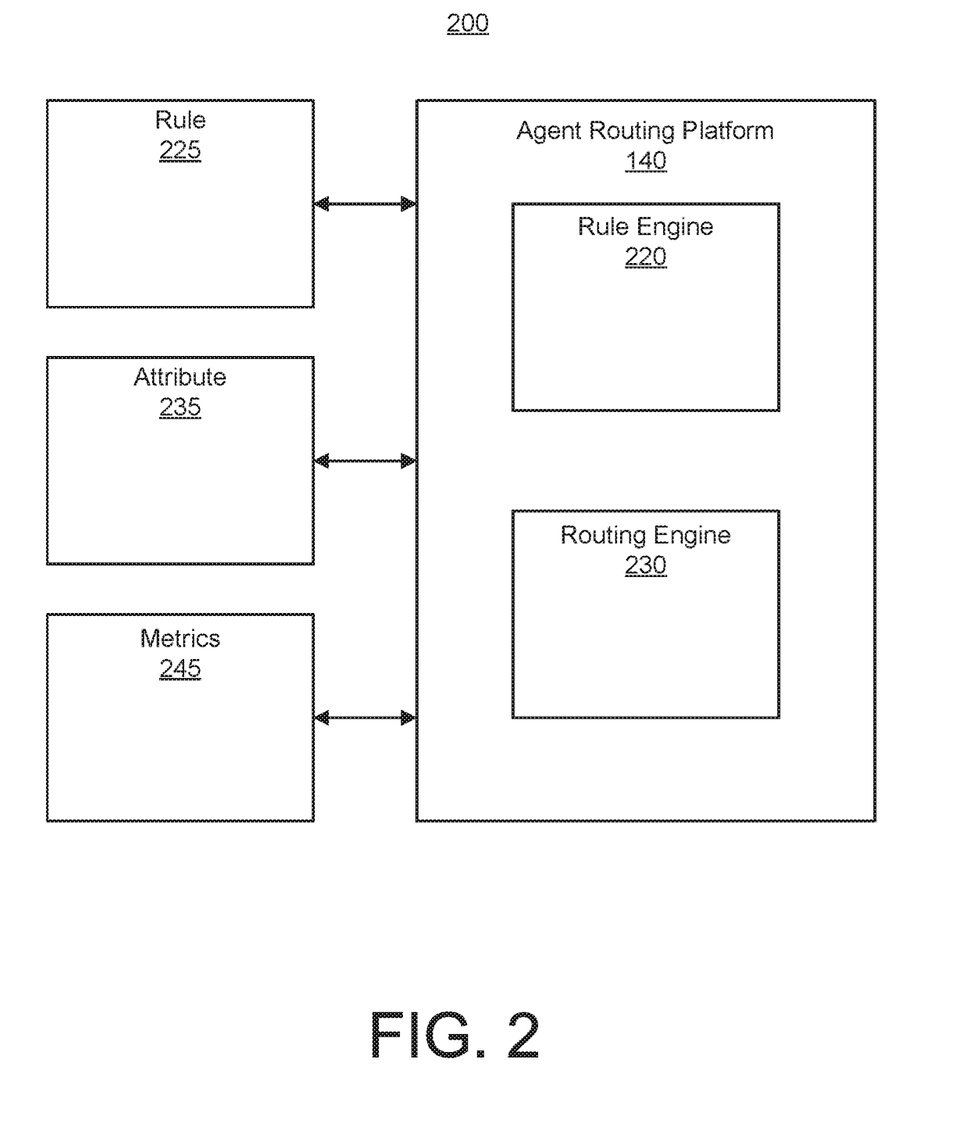
FIG. 2 is an illustration of an example agent routing platform.

FIG. 2 is an illustration of an example agent routing platform 140. As shown the agent routing platform 140 includes various modules including a rule engine 220 and a routing engine 230. More or fewer modules may be supported by the agent routing platform 140. Depending on the embodiment, each of the agent routing platform 140, rule engine 220, and routing engine 230 may be implemented together or separately by one or more general purpose computing devices such as the computing system 700 illustrated with respect to FIG. 7. In addition, while shown as separate from the contact center 150, the agent routing platform 140 may be a component of the contact center 150.

The rule engine 220 may provide for the creation of one or more rules 225 that control the routing of a received communication to an agent 120. In some embodiments, the rule engine 220 may provide a graphical user interface ("GUI") that may be used by a user or administrator to create one or more rules. An example GUI is the GUI 400 illustrated with respect to FIG. 4.

In some embodiments, the user or administrator may create a rule 225 by first selecting or defining a customer category that is associated with the rule 225. A customer category may be a set of characteristics that can be used to place a customer associated with a communication in a customer category. The characteristics associated with a customer category may include country of origin (i.e., what country is the communication coming from), language (i.e., what language is spoken by the customer), communication topic or purpose (i.e., what type of help is the customer seeking), and customer priority (e.g., is the customer a VIP or does the customer pay for support). Other types of characteristics may be supported.

Figure 4:
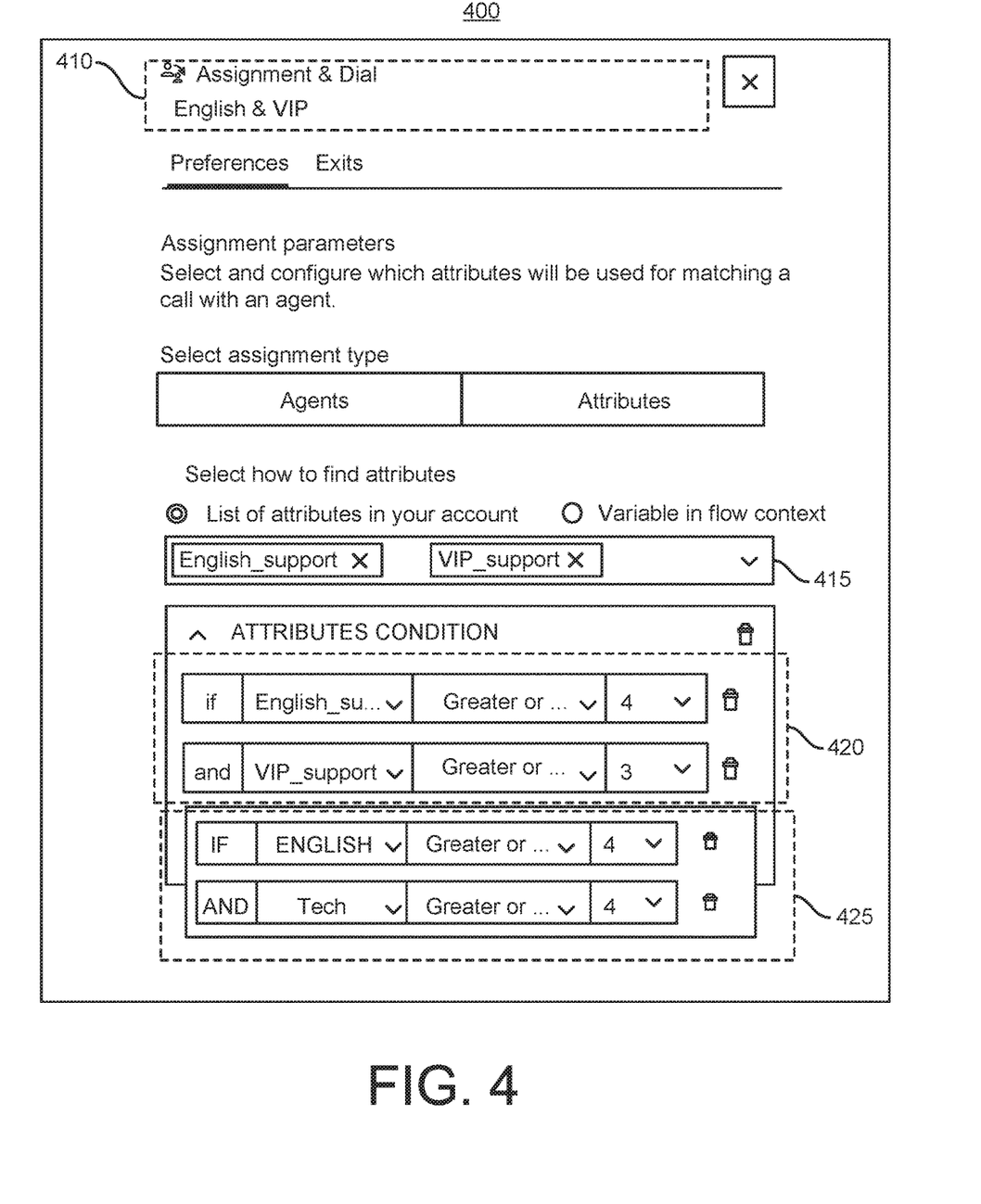
FIG. 4 is an illustration of an example graphical user interface.

For example, as can been in the box 410 of the GUI 400, the administrator has selected a customer category for a rule 225 that includes the characteristics "English" and "VIP". Accordingly, any customer 110 that speaks English and is a VIP will be routed according to the rule 225 being created in the GUI 400. Note that the customer characteristics selected for a rule 225 may include any number of characteristics and may include logical operators other than AND. For example, a customer category could be "(NOT 'English') OR (NOT 'VIP')" which would capture any customer 110 that speaks a language other than English or any customer that is not considered a VIP. Other logical expressions and/or operators may be used to define a customer category.

After selecting or defining a customer category, the rule engine 220 may allow the administrator to create one or more rules 225 to select agents 120 to handle communications that fall into the customer category. In some embodiments, a rule 225 may define the minimum attributes 235 that an agent 120 should posses to handle a communication for the customer category. Examples of attributes include language attributes corresponding to language skills that an agent 120 speaks or is proficient in (e.g., English, Spanish, French, or Mandarin), skill attributes corresponding to business skills that the agent 120 has proficiency in (e.g., technical support, billing, or sales), and performance attributes corresponding to awards or performance milestones that the agent 120 has achieved. The performance attributes may include awards given to the agent 120 for meeting certain customer service or sales goals, experience based milestones such as being an agent 120 for more than one year, two year, five years, etc. Other types of attributes may be supported.

Figure 3:
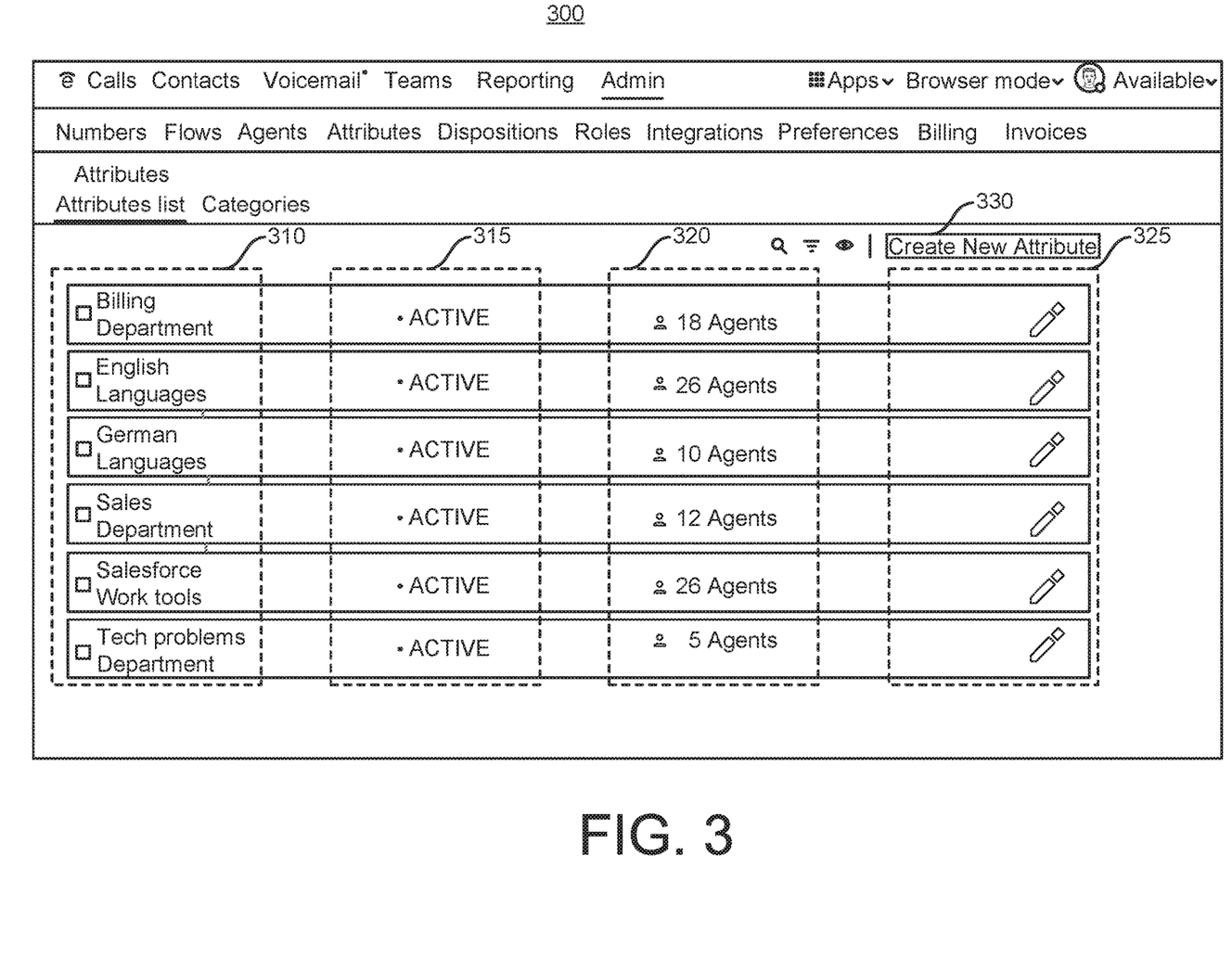
FIG. 3 is an illustration of an example graphical user interface.

FIG. 3 shows an example of a user interface 300 showing the attributes 235 that are available in the agent routing platform 140. In the box 310 can be viewed some of the attributes 235 that have been created so far. These include attributes 235 such as "billing", "English", "German", "sales", "salesforce", and "tech problems". In the box 315 are indicators of whether or not the particular attribute 235 is active or currently being used by the agent routing platform 140. In the box 320 are numbers showing how many active agents 120 possess the particular attribute 235. Such information may be useful for an administrator when creating a rule 225 using the attributes 235.

Also shown in the box 325 are icons through which the administrator can edit one or more of the displayed attributes 235. For example, the administrator could change the name of the attributes 235 or may add one or more proficiency levels to the attributes 235. The administrator 230 may add a new attribute 235 by selecting the button 330.

Returning to FIG. 2, depending on the embodiment, each attribute 235 may be associated with a proficiency level. The proficiency level for an attribute 235 may be a score (e.g., 1-5) that represents how proficient the agent 120 is with respect to the attribute. For example, an agent 120 with a proficiency level of 1 with respect to the attribute 235 "English" may have a very low ability to speak or understand English, and an agent 120 with a proficiency of 5 may be completely fluent in English. In another example, an agent 120 with a proficiency of 1 with respect to the attribute 235 "technical support" may have had some training on technical issues within the contact center 150 and may be suitable to handle communications dealing with simple technical issues. Whereas an agent 120 with a proficiency of 5 may have extensive training or experience with respect to most technical issues within the contact center 150 and may be suitable to handle any technical communication that is received by the contact center 150.

For example, as can been in the box 415 of the GUI 400 of FIG. 4, the administrator has selected two attributes 235 to use to create a rule 225. The selected attributes 235 are "English_support" and "VIP_support". The attribute 235 "English_support" may relate to the English language proficiency of an agent 120. The attribute 235 "VIP_support" may relate to the suitability of the agent 120 for providing support to high priority or "VIP" clients.

As shown in the box 420, after selecting the attributes 235, the administrator has used tools provided by the GUI 400 to generate a rule 225 using the selected attributes 235. In the example shown, the generated rule 225 matches an agent 120 if the agent 120 has proficiency level for the attribute "English_support" that is greater or equal to 4 and has a proficiency level for the attribute "VIP_support" that is greater or equal to 4. Note that in the example shown the administrator selected the logical operators of "if" and "and" when creating the rule 225. However, other logical operators may be used including, but not limited to, "not", "or", "not if", and "xor." Thus, a wide variety of rules 225 may be created to carefully select agents 120 to handle communications for a particular customer category.

As shown in the box 425, the administrator 120 may have provided a second rule 225 for the customer category. Depending on the embodiment, the second rule 225 may be a fallback rule 225 that may be applied in the event that no agents 120 match or are selected by the original or primary rule 225. Alternatively or additionally, the second rule 225 may be used to select agents 120 for the customer category in addition to the primary rule 225. Thus, an agent 120 may be selected for a communication if it satisfies either the rule 225 shown in the box 420 or the rule 225 shown in the box 425.

Returning to FIG. 2, the routing engine 230 may route a received communication to an agent 120 based on the one of more rules 225 and the attributes 235 associated with each agent 120. Depending on the embodiment, the routing engine 230 may store and maintain the attributes 235 associated with each agent 130. For example, the routing engine 230 may store the attributes 235 in storage associated with the agent routing platform 140 and/or the contact center 150.

When a communication is received, the routing engine 230 may first determine the customer category associated with the communication. Depending on the embodiment, the routing engine 230 may determine the customer category using communication information indicating the country of origin associated with the communication and other communication routing information provided by the contact center 150. The routing engine 230 may further determine the customer category using IVR information associated with the communication. For example, the customer may have selected an option indicating the language that they speak (e.g., English or Spanish) and the type of information that they are seeking (e.g., tech support vs. billing). Depending on the embodiment, the received communication may include a customer number or identifier provided by the contact center 150 that may be used to determine the priority or VIP status of the customer and/or the customer category.

The routing engine 230 may retrieve the rules 225 for routing the communication associated with the customer category. The routing engine 230 may retrieve the one or more rules 225 from a rule storage associated with the agent routing platform 140 and/or the contact center 150. Depending on the embodiment, if no rules 225 are associated with the customer category, the routing engine 230 may route the communication to any available agent 120. Alternatively, the routing engine 230 may select an agent 120 using a default or catchall rule 225. The default rule 225 may be set by a user or administrator, for example.

After retrieving the rules 225, the routing engine 230 may determining agents 120 that have attributes 235 that satisfy the rules 225. The routing engine 230 may retrieve the attributes 235 associated with each available agent 120 (i.e., an agent 120 that is not currently on a call or otherwise unavailable) may determine available agents 120 that satisfy the rules 225.

In some embodiments, the attributes 235 for each agent 120 and their optional proficiency levels may be set by a user or administrator. For example, for an attribute 235 called "technical proficiency" the agents 120 may periodically take a test or complete a training course on one or more technical topics associated with the contact center 150. The administrator may then set the proficiency level based on test or training course that is completed. For these attributes 235, the routing engine 230 may retrieve the attributes 235 (and associated proficiency levels) from storage associated with the agent routing platform 140 or the contact center 150.

Additionally, some of the attributes 235 for each agent 120 and their optional proficiency levels may be calculated automatically by the routing engine 230. For example, for an attribute 235 called "Mandarin proficiency" the routing engine 230 may process transcripts of past communications associated with an agent 120. The transcripts may be processed using a model that was trained using transcripts of other Mandarin speakers to identify the proficiency level of a speaker. The model may have been trained using machine learning or other artificial intelligence-based techniques. The score determined by the model may be used to set the proficiency level of the agent 120. Similar model-based techniques may be used to set the proficiency levels of other attributes 235 such as customer service related attributes 235 and technology related attributes 235, for example.

Depending on the embodiment, the routing engine 230 may periodically calculate the attributes 235 (and related proficiency levels) and may retrieve the calculated attributes 235 for each available agent when a communication is received by the agent routing platform 140. Alternatively or additionally, for at least some attributes 235, the routing engine 230 may dynamically calculate some or all of the attributes 235 for an agent 120 in response to receiving a communication. By calculating an attribute 235 or proficiency dynamically in response to a communication, the routing engine 230 ensures that the attributes 235 are up current with respect to the most recent data available to the contact center 150.

In some embodiments, when calculating an attribute 235 (and associated proficiency level) the routing engine 230 may favor or weigh more heavily recent communication or communication transcripts over previous transcripts. For example, when calculating an attribute 225 related to following contact center 150 procedures such as following a script, the routing engine 230 may use the most recent communication transcripts available, and/or customer satisfaction surveys, and a model to determine the proficiency level for an agent 120. As may be appreciated, by calculating proficiency levels and attributes 235 using the most recent communication transcripts and data the routing engine 230 may quickly recognize certain trends or changes in agent 120 behavior. For example, an otherwise excellent agent 120 may be having a bad day resulting in low adherence to contact center 150 policies. The routing agent 230 could recognize the poor performance and could reduce the proficiency level for a customer service related attribute 235. Because of the reduced proficiency level the agent 120 could be routed communications associated with lower priority customers.

After the routing engine 230 determines the attributes 235 for each agent 120, the routing engine 230 may select an agent 120 that whose attributes satisfies any or all of the rules 225 determined for the communication. The communication may then be routed to the selected agent 120. Where multiple agents 120 are available that satisfy the rules 225, The routing engine 230 may select the agent 120 using one or more performance metrics 245. Depending on the embodiment, the performance metrics 245 associated with an agent 120 may be metrics tracked by the contact center 150. The metrics 245 may include average communication handling time (i.e., how long does it take the agent 120 to complete the communication) and customer satisfaction scores (i.e., the scores provided by customers after a communication is completed). Other metrics may be used. The particular metrics 245 considered may be set by a user or administrator.

In some implementations, when no matching agents 125 are determined by the routing engine 230, the routing engine 230 may determine an agent 125 who may not have one of the attributes 235 specified by the rule 225, but nonetheless performed well on a previous communication where the attribute 235 was present. For example, an agent 120 may have a low proficiency level in a technical support attribute 235 or may lack the attribute 235 entirely. On a previous communication, due to misrouting or customer misrepresentation, the agent 120 handled a communication that should have been routed to an agent 120 with a higher proficiency level for that attribute 235. After the communication, based on a customer survey, or based on an analysis of a transcript of the communication, the agent 120 may have been determined to have done well on the communication. Accordingly, the determined agent 120 may be used by the routing engine 230 for rules 225 when no agent 120 with technical support attributes 235 are available.

In some implementations, the routing engine 230 may maintain a list or database of agents 120 who performed above their proficiency level (or lacked the corresponding attribute 285) for one more attributes 235 on past communications with customers 110. The routing engine 230 may score how the agent 120 handled a past communication that the agent 120 was not qualified to handle (either automatically, using a customer survey, or by a supervisor), and may determine if the score is above a threshold score. If the score for the communication is above the threshold score, the routing engine 230 may add the agent 120 to the list for the particular attribute.

When no agent 120 matching a rule 225 can be determined because of a particular attribute 235, attribute 235 combination, or proficiency level, the routing engine 230 may determine if one of the agents 120 on the list for the particular attribute 235 could be used to handle the communication. Depending on the embodiment, when an agent 120 is added to the list for a particular attribute 235, the attribute 235 may also be associated with the agent 120.

As may be appreciated, the agent routing platform 140 described herein is an improvement over existing communication routing system. First, because the communications are routed to agents 120 based on agent attributes 235 rather than agent queues, the inefficient distribution of agent resources associated with agent queues is greatly reduced. Second, because the communications are routed using rules 225 that are based on arbitrary combinations of agent attributes 235, an administrator has a much greater control over the experience and expertise of the agents 120 that receive communications for certain classes of customer. This may lead to both a better communication experience for customers and a shorter average communication time.

As may be appreciated, in the present application, unlike previous solutions, there is no relationship between queues and agents 120. Agents 120 are characterized by attributes 235 (e.g., the type of skills they have and their level of proficiency in them). Queues, on the other hand, are characterized by the reasons why particular customers 110 are contacting the contact center 150. In embodiments, queues are solely used for reporting purposes, to track contact center 150 performance, and as configuration object that allows setting different reporting thresholds. However, queues are not used to route communications to agents 120.

Figure 5:
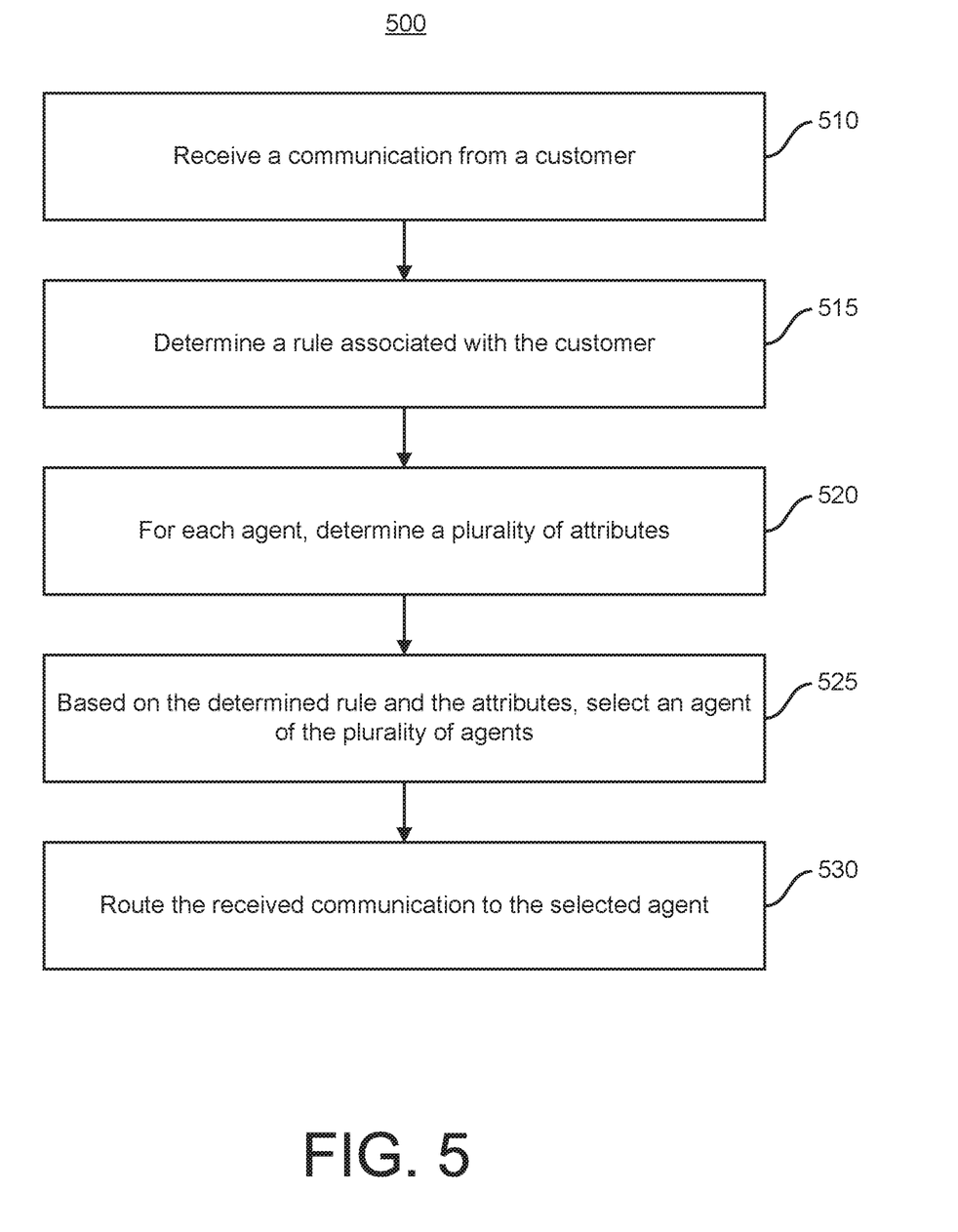
FIG. 5 is an illustration of an example method for routing communications to an agent.

FIG. 5 is an illustration of an example method 500 for routing a communication to an agent 120 using attributes 235 and rules 225. The method 500 may be implemented by the routing engine 230 of the agent routing platform 140.

At 510, a communication is received from a customer. The communication may be received by the routing engine 230 of the agent routing platform 140. The agent routing platform 140 may be part of or associated with a contact center 150. The customer 110 may be communicating to receive customer service for a variety of issues such as technical support, billing, ordering, etc. The received communication is not limited to telephone-based communications and may include chat, text messaging, e-mail, etc. Any communication channel may be used.

At 515, a rule associated with the customer is determined. The rule 225 associated with the customer 110 may be determined by the routing engine 230. In some embodiments, the routing engine 230 may determine the rule 225 by first determining a customer category associated with the customer 110. The customer category may be based on a variety of factors such as the country of origin associated with the communication, the communication channel or type of the communication (e.g., telephone call, chat, or e-mail), the language spoken by the customer 110, the purpose of the communication (e.g., billing or technical support), and the status of the customer 110 (e.g., VIP or low-priority customer). The customer category may be indicated by data or other information associated with the received communication, for example.

The routing engine 230 may determine the rule 225 associated with the customer category. The rule 225 may include a combination of attributes 235 that describe the types of agents 120 that should handle the communications for customers 110 of the customer category. The rule 225 may have been provided or created by an administrator. There may be multiple rules 225 associated with a customer category.

At 520, for each agent, a plurality of attributes is determined. The plurality of attributes 235 associated with each agent 120 may be determined by the routing engine 230. Some or all of the attributes 235 may include a proficiency level. Depending on the embodiment, the routing engine 230 may retrieve the plurality of attributes 235 associated with each agent 120 from storage. Alternatively or additionally, the routing engine 230 may dynamically calculate some or all of the attributes 235 and proficiency levels associated with agents 120 using history data associated with each agent 120 such as transcripts and customer satisfaction surveys associated with previous phone communications.

At 525, based on the determined rule and the attributes, an agent of the plurality of agents is selected. The agent 120 may be selected by the routing engine 230 by applying the determined rule 225 to the attributes 235 associated with each agent 120 and determining agents 120 whose attributes 235 satisfy the determined rule 225. If multiple available agents 120 are determined, the routing engine 230 may randomly select an agent 120, may select the agent 120 that has been the least busy, or may select the agent 120 with the greatest performance metrics.

At 530, the received communication is routed to the selected agent. The received communication may be routed to the selected agent 120 by the routing engine 230.

Figure 6:
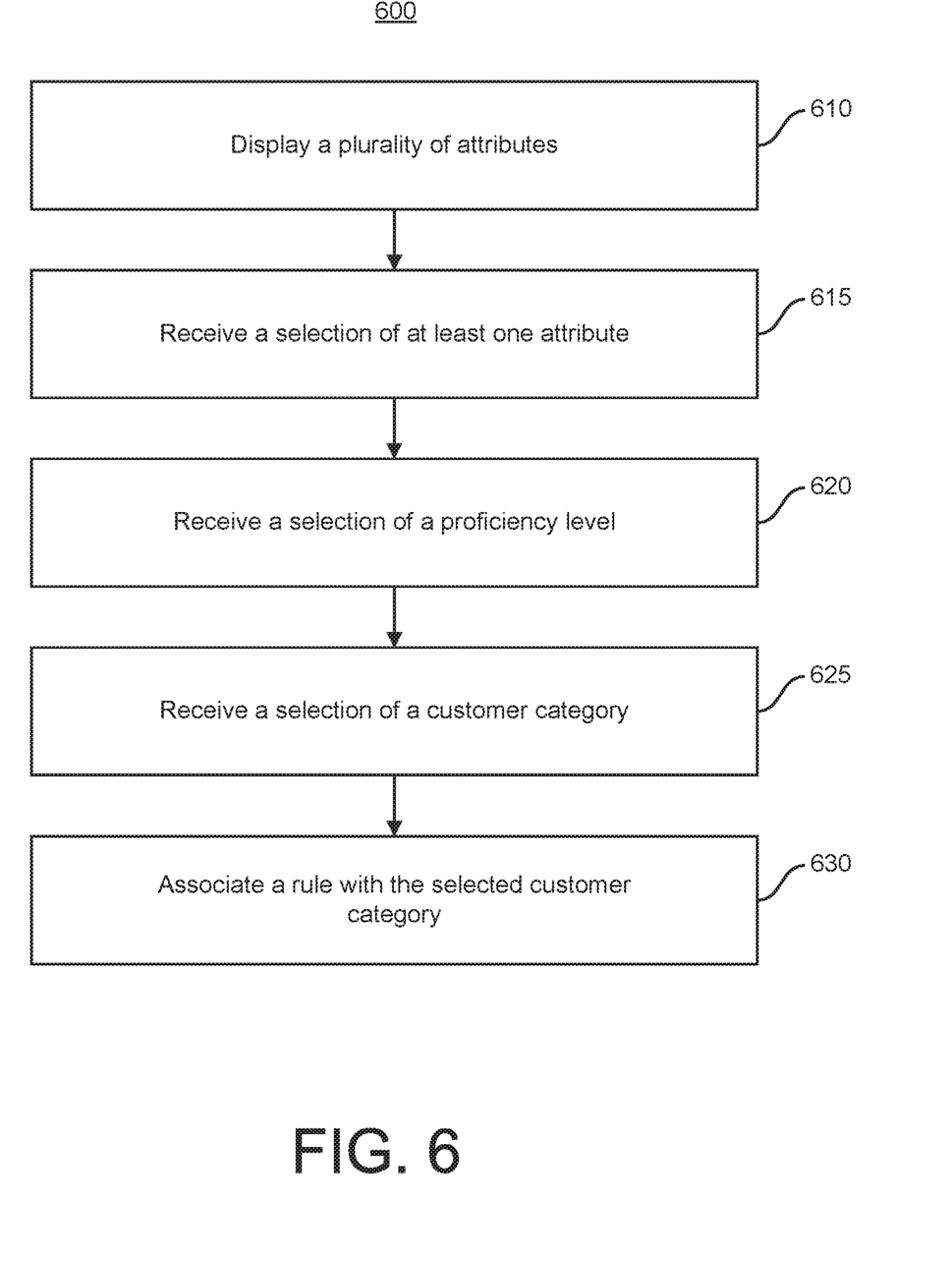
FIG. 6 is an illustration of an example method for generating a rule for routing communications to agents.

FIG. 6 is an illustration of an example method 600 for generating a rule 225 for a customer category. The method 600 may be implemented by the rule engine 220 of the agent routing platform 140.

At 610, a plurality of attributes is displayed. The plurality of attributes 235 may be displayed in a GUI by the rule engine 220 to an administrator. The administrator may be creating a rule 225 to control how communications are routed to agents 120 for a contact center 150.

At 615, a selection of at least one attribute is received. The selection of at least one attributes 235 may be received by the rule engine 220 from the administrator through the GUI. The selected at least one attribute 235 may be associated with a skill that the agent 120 that will handle the communication should have. Examples of attributes 235 include language attributes 235 and skill attributes 235. Other attributes 235 may be supported.

At 620, a selection of a proficiency level is received. The selection of a proficiency level may be received by the rule engine 220 from the administrator through the GUI. The selected proficiency level may describe how proficient the agent 120 should be with respect to the desired attribute 235 for the rule 225. For example, for a language attribute 235 for the Mandarin language, the selected proficiency level may describe how well the agent 120 speaks Mandarin.

At 625, a selection of a customer category is received. The selection of a customer category may be received by the rule engine 220 from the administrator through the GUI. The customer category may be used by the routing engine 230 to determine which rule 225 to use to route a communication from a customer 110. The category may be based on a variety or customer 110 and communication characteristics such as language spoken by the customer 110, the country of origin associated with the customer 110, a status of the customer 110, and a topic or purpose of the communication. Other customer 110 and communication characteristics may be supported.

At 630, a rule is associated with the selected customer category. The rule 225 may be based on the selected at least one attribute 235 and proficiency level and may be associated with the selected customer category by the rule engine 220. When a subsequent communication is received from a customer 110 of the selected communication category, the routing engine 230 may select an agent 120 to handle the communication based on the rule 225.

Figure 7:
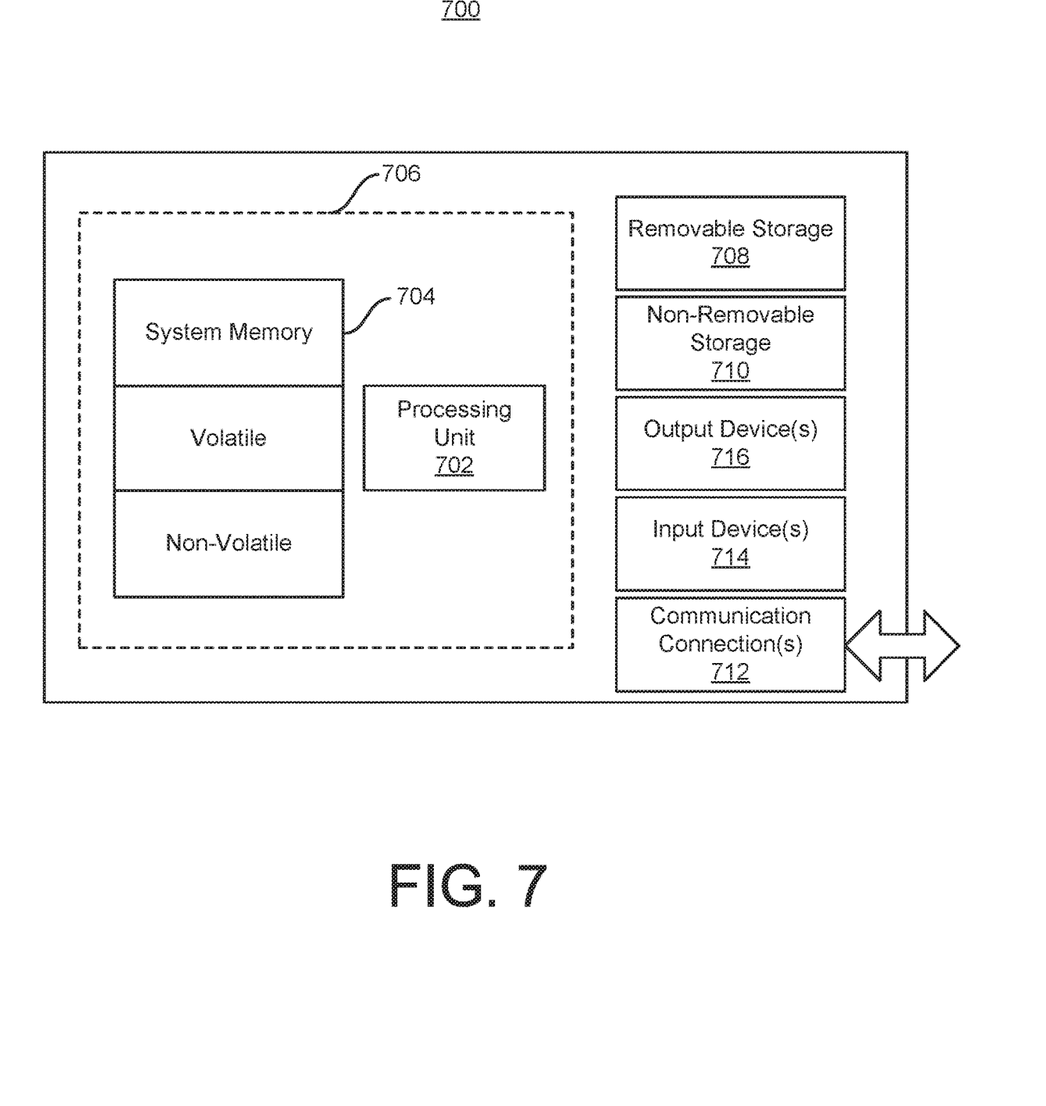
FIG. 7 illustrates an example computing device.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), mini-computers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of tangible computer readable media. Computer readable media can be any available tangible media that can be accessed by device 700 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communications connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving an electronic communication by a computing device from a customer;
   determining a topic of the communication;
   assigning the communication to a queue associated with the topic
   determining, by a computing device, a rule associated with the topic, the rule including at least one attribute that must be satisfied whereby the rule can be applied to direct the communication to an agent over a computer network;
   for each agent of a plurality of agents assigned to the queue, determining a plurality of attributes associated with the agent by a computing device, wherein the plurality of attributes comprises one or more of age attributes, geographical attributes, and/or premium service attributes;
   determining, by a computing device, based on the determined rule and the plurality of attributes determined for each agent, that no agent of the plurality of agents assigned to the queue has the at least one attribute required to satisfy the determined rule; and
   in response to the determination, a computing device changing the rule associated with the topic to broaden the at least one attribute that must be satisfied, whereby additional agents can satisfy the rule.

2. The method of claim 1, wherein at least one of the attributes comprises a proficiency level.

3. The method of claim 1, wherein the at least one attribute comprises a plurality of attributes.

4. The method of claim 1, wherein the plurality of attributes comprises language attributes, skill attributes, age attributes, geographical attributes, and premium service attributes.

5. The method of claim 1, wherein changing the rule comprises adding at least one attribute to the rule along with an OR operator.

6. The method of claim 1, wherein changing the rule comprises replacing at least one AND operator in the rule with an OR operator.

7. A system comprising:
   at least one processor; and
   a non-transitory computer readable medium comprising instructions that, when executed by the at least one processor, cause the system to:
   receive an electronic communication from a customer;
   determine a topic of the communication;
   assign the communication to a queue associated with the topic;
   determine a rule associated with the topic, the rule including at least one attribute that must be satisfied whereby the rule can be applied to direct the communication to an agent over a computer network;
   for each agent of a plurality of agents assigned to the queue, determine a plurality of attributes associated with the agent, wherein the plurality of attributes comprises one or more of age attributes, geographical attributes, and/or premium service attributes;
   determine, based on the determined rule and the plurality of attributes determined for each agent, that no agent of the plurality of agents assigned to the queue has the at least one attribute required to satisfy the determined rule; and
   in response to the determination, change relax the rule associated with the topic to broaden the at least one attribute that must be satisfied, whereby additional agents can satisfy the rule.

8. The system of claim 7, wherein at least one of the attributes comprises a proficiency level.

9. The system of claim 7, wherein the at least one attribute comprises a plurality of attributes.

10. The system of claim 7, wherein the plurality of attributes comprises language attributes, skill attributes, age attributes, geographical attributes, and premium service attributes.

11. The system of claim 7, wherein changing the rule comprises adding at least one attribute to the rule along with an OR operator.

12. The system of claim 7, wherein changing the rule comprises replacing at least one AND operator in the rule with an OR operator.

13. A non-transitory computer-readable medium comprising instructions that, when
   executed by at least one processor, cause a computer system to:
   receive an electronic communication from a customer;
   determine a topic of the communication;
   assign the communication to a queue associated with the topic;

determine a rule associated with the topic, the rule including at least one attribute that must be satisfied whereby the rule can be applied to direct the communication to an agent over a computer network;

for each agent of a plurality of agents assigned to the queue, determine a plurality of attributes associated with the agent, wherein the plurality of attributes comprises one or more of age attributes, geographical attributes, and/or premium service attributes;

determine, based on the determined rule and the plurality of attributes determined for each agent, determine that no agent of the plurality of agents satisfies the determined; and in response to the determination, change the rule associated with the topic to broaden the at least one attribute that must be satisfied, whereby additional agents can satisfy the rule.

14. The computer-readable medium of claim 13, wherein at least one of the attributes comprises a proficiency level.

15. The computer-readable medium of claim 13, wherein the at least one attribute comprises a plurality of attributes.

16. The computer-readable medium of claim 13, wherein the plurality of attributes comprises language attributes, skill attributes, age attributes, geographical attributes, and premium service attributes.

17. The computer-readable medium of claim 13, wherein changing the rule comprises adding at least one attribute to the rule along with an OR operator.

18. The method of claim 1, wherein the at least one attribute comprises a performance metric.

19. The system of claim 7, wherein the at least one attribute comprises a performance metric.

20. The computer-readable medium of claim 13, wherein the at least one attribute comprises a performance metric.

21. The method of claim 1, wherein the at least one attribute is indicative of previous contacts between an agent and a caller.

22. The system of claim 7, wherein the at least one attribute is indicative of previous contacts between an agent and a caller.

23. The computer-readable medium of claim 13, wherein the at least one attribute is indicative of previous contacts between an agent and a caller.

24. The method of claim 1, wherein determining a topic of the communication comprises receiving a customer specification of the topic.

25. The system of claim 7, wherein determining a topic of the communication comprises receiving a customer specification of the topic.

26. The computer-readable medium of claim 13, wherein determining a topic of the communication comprises receiving a customer specification of the topic.

27. The method of claim 1, wherein at least one of the additional agents is not assigned to the cue.

28. The system of claim 7, wherein at least one of the additional agents is not assigned to the cue.

29. The computer-readable medium of claim 13, wherein at least one of the additional agents is not assigned to the cue.

30. The computer-readable medium of claim 13, wherein changing the rule comprises replacing at least one AND operator in the rule with an OR operator.

* * * * *